(12) United States Patent
Subramanian et al.

(10) Patent No.: US 11,805,287 B2
(45) Date of Patent: Oct. 31, 2023

(54) SYSTEMS AND METHODS FOR TRANSITIONING BETWEEN DIFFERENT CONTENT

(71) Applicant: Verizon Patent and Licensing Inc., Basking Ridge, NJ (US)

(72) Inventors: Ananthanarayanan Subramanian, Lewisville, TX (US); Srinivasulu Ganipineni, Frisco, TX (US); Vijay Srusti, Irving, TX (US); Venkata Srinivas Burugupalli, Farmers Branch, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/647,102

(22) Filed: Jan. 5, 2022

(65) Prior Publication Data
US 2023/0217051 A1 Jul. 6, 2023

(51) Int. Cl.
*H04N 21/2387* (2011.01)
*H04N 21/858* (2011.01)
*H04N 21/433* (2011.01)
*H04L 27/34* (2006.01)

(52) U.S. Cl.
CPC ....... *H04N 21/2387* (2013.01); *H04L 27/345* (2013.01); *H04N 21/4331* (2013.01); *H04N 21/8586* (2013.01)

(58) Field of Classification Search
CPC .......... H04N 21/2387; H04N 21/4331; H04N 21/8586; H04N 21/812; H04N 21/6587; H04N 21/242; H04N 21/4302; H04N 21/4622

USPC ......................................................... 725/32
See application file for complete search history.

(56) References Cited

U.S. PATENT DOCUMENTS

| | | | | |
|---|---|---|---|---|
| 2002/0144262 A1* | 10/2002 | Plotnick | ............... | H04N 21/458 348/E7.071 |
| 2003/0149975 A1* | 8/2003 | Eldering | ............ | H04N 21/4532 348/E7.071 |
| 2009/0031339 A1* | 1/2009 | Pickens | ................ | H04N 21/812 725/32 |
| 2010/0205049 A1* | 8/2010 | Long | .................. | G06Q 30/0252 705/14.5 |
| 2014/0173650 A1* | 6/2014 | Mathews | ........... | H04N 21/6543 725/32 |
| 2014/0189139 A1* | 7/2014 | Cheng | ................ | H04N 21/4325 709/231 |

(Continued)

*Primary Examiner* — Cynthia M Fogg (57) ABSTRACT

In some implementations, a device may provide content received via a quadrature amplitude modulation channel. The device may receive supplemental content information regarding supplemental content to be provided during a period of time associated with providing the content, wherein the supplemental content information includes a uniform resource locator (URL) identifying a location of the supplemental content and start time information identifying a time when the supplemental content is to be provided. The device may obtain the supplemental content using the URL. The device may transition, from providing the content, to providing the supplemental content based on the start time information. The device may transition, from providing the supplemental content, to providing the content after providing the supplemental content.

20 Claims, 9 Drawing Sheets

(56) References Cited

U.S. PATENT DOCUMENTS

| | | | |
|---|---|---|---|
| 2014/0230003 A1* | 8/2014 | Ma | H04N 21/4147 |
| | | | 725/115 |
| 2015/0143439 A1* | 5/2015 | Fay | H04N 21/2385 |
| | | | 725/95 |
| 2018/0359502 A1* | 12/2018 | Romwell | H04N 21/4524 |
| 2019/0069004 A1* | 2/2019 | Badawiyeh | H04N 21/2383 |
| 2021/0306199 A1* | 9/2021 | McCarty | H04L 47/801 |
| 2022/0191082 A1* | 6/2022 | McCarty | H04L 27/36 |

* cited by examiner

```
{
  "ClientId": "0",
  "NotificationId": "NTFY_ADCUE_LIST",
  "NotificationType": "APP_EVENT",
  "NotificationData": {
    "AdCueList": [
      {
        "Tuner": 5,
        "ChNum": 123,
        "BreakId": 34382645,
        "AdUrl": "/Ads/testAsset/testAsset.mp4",
        "AdrId": 12345,
        "IsNextAdAce": 0,
        "AdStartOffset": 0,
        "AdDuration": 3000,
        "TimeToStart": 8673,
        "AdStartTime": "2733116462",
        "TestInfo": {
          "AdUrl": "/Ads/test.mp4",
          "AdDuration": 30
        }
      }
    ]
  }
}
```

FIG. 1E

170
Transition, from providing the content, to providing the supplemental content based on the amount of delay time Client Device 105

SYSTEMS AND METHODS FOR TRANSITIONING BETWEEN DIFFERENT CONTENT

BACKGROUND

Television programming distributors (e.g., operating a content platform) may receive a quantity of time (e.g., in minutes) per hour (e.g., a time slot) to utilize television content (e.g., advertisements) for each television channel distributed to subscribers. Content delivery platforms may deliver only a limited number of different television content on a same channel during a same time slot.

DETAILED DESCRIPTION OF PREFERRED EMBODIMENTS

The following detailed description of example implementations refers to the accompanying drawings. The same reference numbers in different drawings may identify the same or similar elements.

A content provider may provide content via a quadrature amplitude modulation (QAM) channel. For example, a set-top box may tune to the QAM channel and the content provider may provide the content via the QAM channel. The content may be provided over a period of time based on an amount of QAM bandwidth allocated for the content.

In some instances, the content provider may desire to provide supplemental content during different portions of the period of time. In this regard, the content provider may request (using a computing device) an additional amount of QAM bandwidth to provide the supplemental content. In some situations, the requested additional amount of QAM bandwidth may not be available. Accordingly, the content provider may provide additional requests for the additional amount of QAM bandwidth until the additional amount of QAM bandwidth is allocated. Alternatively, the content provider may reconfigure (using a computing device) the supplemental content to accommodate for a limited amount of bandwidth. Therefore, relying on QAM bandwidth for providing supplemental content in this manner wastes computing resources, network resources, among other resources.

Implementations described herein are directed to providing Internet Protocol (IP) based supplemental content. For example, a client device (e.g., a set-top box) may tune to a QAM channel and provide, to a supplemental content management device, a notification indicating that that the client device has tuned to the QAM channel. Based on the notification, the supplemental content management device may provide information regarding supplemental content that may be provided during one or more portions of a period of time associated with providing the content. The information may include information identifying a network location of the supplemental content (e.g., a uniform resource locator (URL) of the supplemental content), information identifying a duration of the supplemental content, information identifying a start time for providing the supplemental content, among other examples. The client device may obtain the supplemental content (e.g., using the URL) and provide the supplemental content at the start time. The supplemental content may be provided during the one or more portions of the period of time associated with providing the content.

By providing IP-based supplemental content in this manner, the client device may preserve computing resources, network resources, and other resources that would have otherwise been used by relying on QAM bandwidth for providing supplemental content.

Figure 1A:
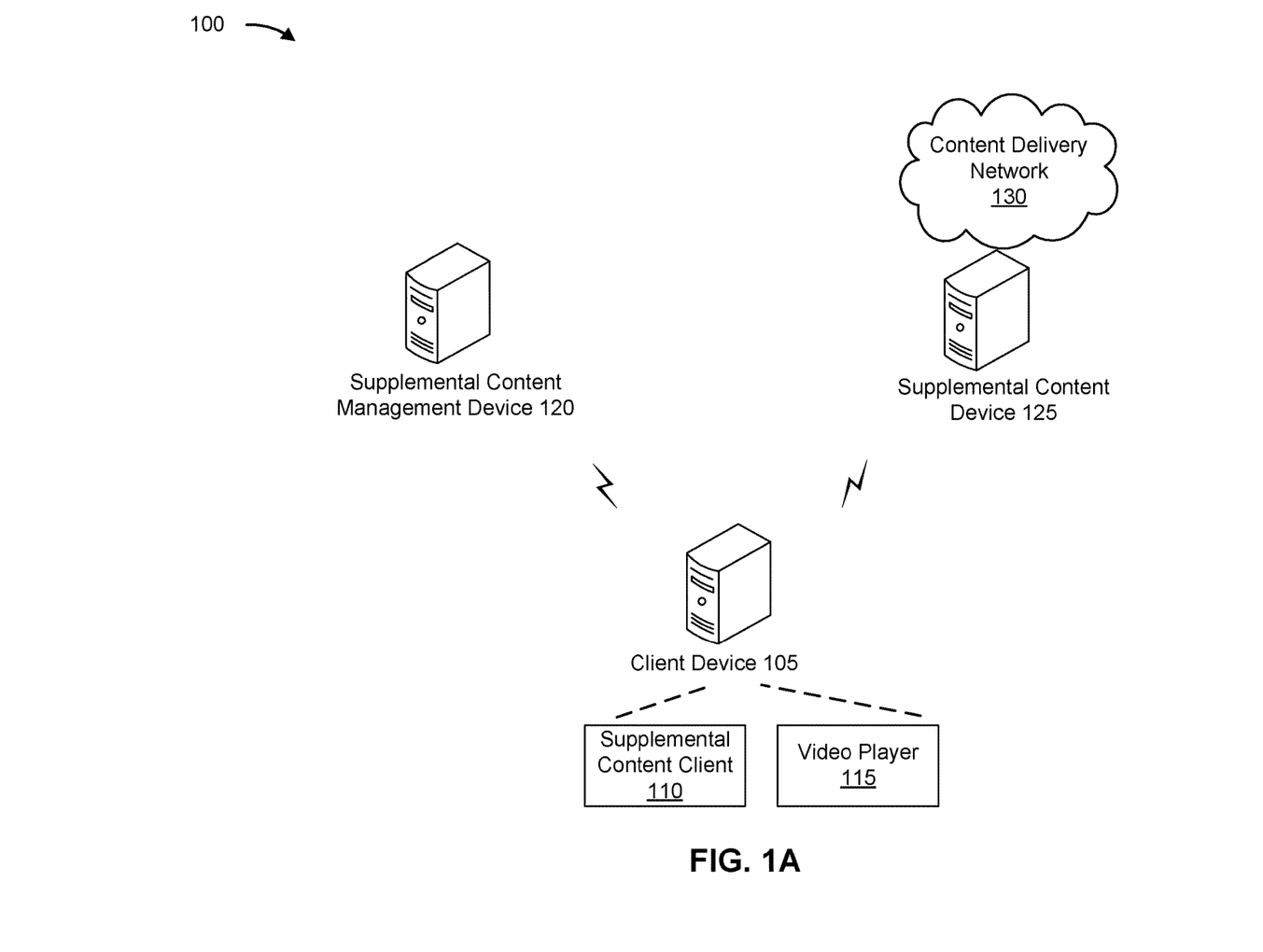
FIGS. 1A-1F are diagrams of an example associated with transitioning between different content.

FIGS. 1A-1F are diagrams of an example 100 associated with transitioning between different content. As shown in FIG. 1A, example 100 includes a client device 105, a supplemental content management device 120, and a supplemental content device 125. Client device 105 may include one or more devices capable of receiving, generating, storing, processing, and/or providing information associated with transitioning between different content, as described elsewhere herein. For example, client device 105 may provide content received via a QAM channel of a content provider, transition to provide supplemental content obtained using a URL, and transition to provide the content, as described elsewhere herein. In some examples, client device 105 may include a set-top box.

As used herein, the term "content" may include visual data, audio data, a combination of audio data and visual data, among other examples of media content. In some examples, the content may include television content, such as broadcasting television content, local programming, national programming, free programming, live-programming (e.g., a live broadcast), movies, sports, television shows, video-on-demand (VoD) content, premium channel content, and pay-per-view (PPV) content.

As shown in FIG. 1A, client device 105 may include a supplemental content client 110 and a video player 115. Supplemental content client 110 may be configured to monitor channel change events on client device 105 and provide, to supplemental content management device 120, notifications regarding the channel change events (e.g., events associated with changing channels). Video player 115 may be configured to provide content from QAM channels and content from a memory of client device 105 (e.g., a local storage device such as a digital video recorder (DVR)). In some situations, video player 115 may be configured to track a current position of content broadcast by the content provider, as described below. Client device 105 may be located at premises of a user. In some examples, client device 105 may include multiple tuners and client device 105 may be configured to provide signals (e.g., via IP connections) to devices deployed throughout the premises. Supplemental content client 110 and video player 115 may communicate through an application programming interface (API) that allows messages to be sent between them.

Supplemental content management device 120 may include one or more devices capable of receiving, generating, storing, processing, and/or providing information associated with transitioning between different content, as described elsewhere herein. For example, supplemental content management device 120 may identify supplemental content to be provided by client device 105 and identify supplemental content information that may be used by client device 105 to provide the supplemental content. Supplemental content management device 120 may provide the supplemental content information to client device 105. Supplemental content management device 120 may perform similar actions for other client devices.

Supplemental content device 125 may include one or more devices capable of receiving, generating, storing, processing, and/or providing information associated with transitioning between different content, as described elsewhere herein. For example, supplemental content device 125 may store the supplemental content identified by supplemental content management device 120 and may provide the supplemental content to client devices. As shown in FIG. 1A, supplemental content device 125 may be included in content delivery network 130.

Figure 1B:
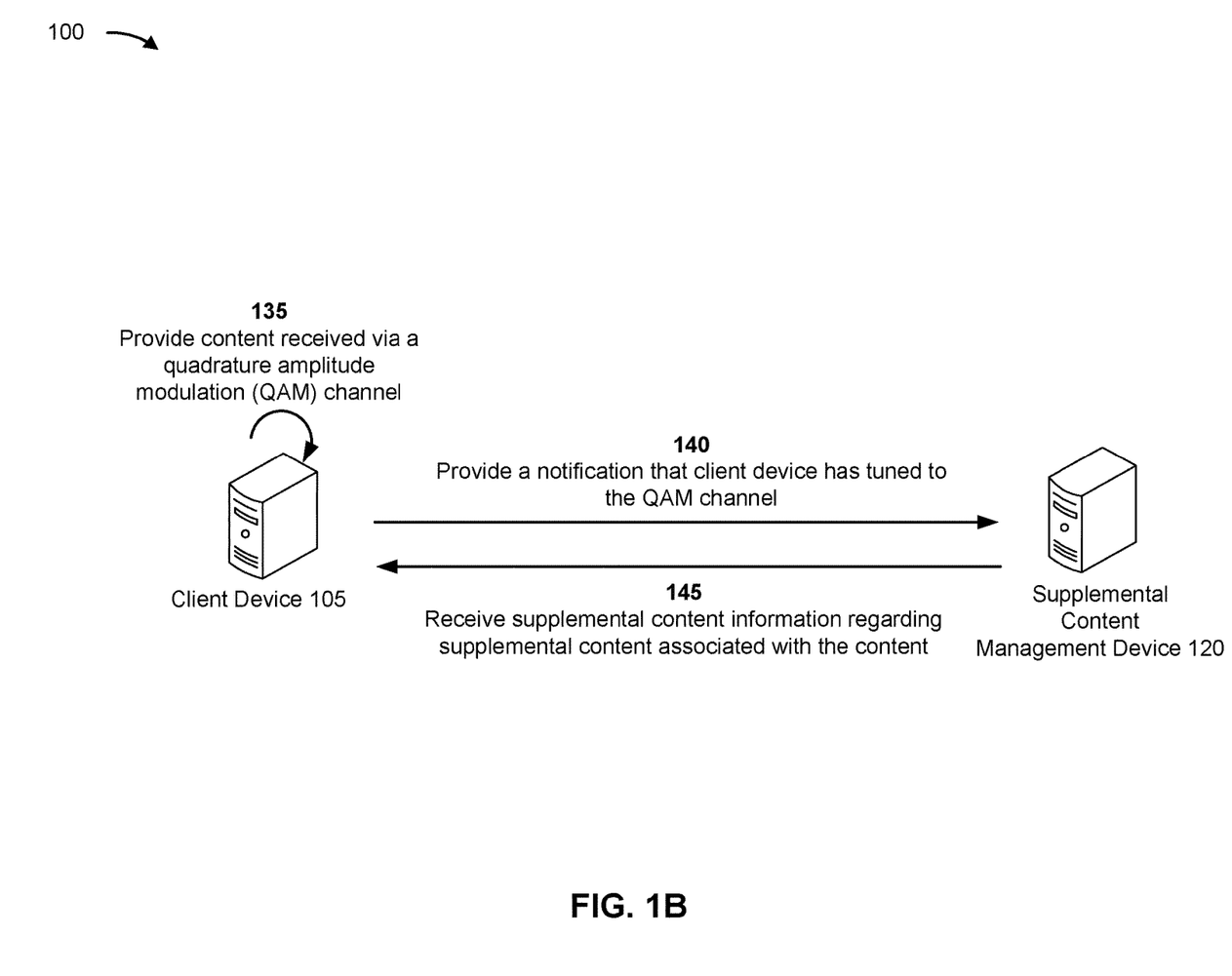

As shown in FIG. 1B, and by reference number 135, client device 105 may provide content received via a QAM channel. For example, a user of client device 105 may cause client device 105 to tune to the QAM channel and client device 105 may receive content QAM channel. For instance, the user may provide a channel request to tune to the QAM channel and client device 105 may tune to the QAM channel. In some implementations, the content may be received from a content device associated with a content provider. Based on the channel request, client device 105 may provide a content request to the device associated with the content provider and may receive the content from the device based on the content request.

Client device 105 may provide the content using video player 115. In some situations, client device 105 (e.g., using video player 115) may provide the content by providing the content to a display device (e.g., a television) for display to the user. Additionally, or alternatively, client device 105 (e.g., video player 115) may provide the content by providing the content to an audio device (e.g., one or more speakers). Client device 105 may also provide the content to other devices connected to the client device 105 which may have their own video players 115 (e.g., other devices connected to the client device 105 over a network at a premises where the client device 105 is located).

Video player 115 may output the content as an audio and/or video signal to a connected display. Video player 115 may also store the content in a memory to allow for the pause, rewind or fast forward of the content by the content viewer (sometimes referred to a "trick play" features). As an example, a viewer may pause the playing of a content, and then resume the playing of the content at a later time. The content output to the connected display will be thereby "delayed" in comparison to the time at which the content was actually received.

As shown in FIG. 1B, and by reference number 140, client device 105 may provide a notification that client device 105 has tuned to the QAM channel. For example, after tuning to the QAM channel based on the channel request, client device 105 may provide the notification to supplemental content management device 120. The notification may include information identifying client device 105, information identifying the QAM channel, information identifying the content, information identifying a date and/or a time the channel request was received, among other examples.

The information identifying client device 105 may include a serial number of client device 105, a model number of client device 105, information identifying a geographical location of client device 105, information regarding a user profile of the user (and/or of one or more other users associated with client device 105), among other examples. The information regarding the user profile may include information regarding types of content preferred by the user, information regarding one or more products preferred by the user, information regarding one or more services preferred by the user, among other examples.

A "type of content" may refer to movies in general, a type of movie, television shows in general, a type of television show, music in general, a genre of music, among other examples of other types of content. The information identifying the QAM channel may include a name of the QAM channel, a channel number of the QAM channel, among other examples of information that may identify the QAM channel. The information identifying the content may include a title of the content, a name of the content, a type of the content, among other examples.

As shown in FIG. 1B, and by reference number 145, client device 105 may receive supplemental content information regarding supplemental content associated with the content. For example, based on providing the notification to supplemental content management device 120, client device 105 may receive the supplemental content information from supplemental content management device 120. In some implementations, supplemental content management device 120 may identify the supplemental content based on the information identifying the content, based on the information identifying client device 105, based on the information identifying the QAM channel, among other examples. For example, the supplemental content may include content that is based on the content provided by client device 105. Additionally, or alternatively, the supplemental content may include content that is based on the geographical location of client device 105.

Additionally, or alternatively, the supplemental content may include content that is based on the user profile. For example, the supplemental content may include content based on the types of content preferred by the user, content based on the one or more products preferred by the user, content based on the one or more services preferred by the user, among other examples. In some situations, supplemental content management device 120 may identify different supplemental content, such as first supplemental content, second supplemental content, and so on. Alternatively, supplemental content management device 120 may identify single supplemental content.

Supplemental content management device 120 may identify the supplemental content information based on the supplemental content. For example, supplemental content management device 120 may identify first supplemental content information based on the first supplemental content, second supplemental content information based on the second supplemental content, and so on.

In some implementations, the first supplemental content information may include information identifying the QAM channel, information identifying the first supplemental content, location information identifying a location of the first supplemental content (e.g., a network location), start time information identifying a time when the first supplemental content is to be provided (e.g., a time to start providing the supplemental content), duration information identifying a duration associated with providing the first supplemental content, presentation timestamp (PTS) information identifying a PTS associated with the first supplemental content, offset information identifying an offset with respect to a time when other prior supplemental content is to be provided, among other examples.

The information identifying the QAM channel may include a name of the QAM channel, a channel number of the QAM channel, among other examples. The information identifying the first supplemental content may include a name or a title of the first supplemental content, an identifier of the first supplemental content, among other examples. The location information may identify a uniform resource identifier (URI) identifying the network location. As an example, the URI may include a URL identifying the location of the first supplemental content.

The start time information may identify the time in different time formats. The offset may be based on a duration of other supplemental content is to be provided prior to the first supplemental content being provided. For example, if the second supplemental content is to be provided prior to the first supplemental content, the offset may be based on a duration of the second supplemental content. The offset may identify an amount of time to be elapsed, after the second supplemental content has been provided, prior to the first supplemental content being provided. The second supplemental content information may include information similar to the information included in the first supplemental content information.

Figure 1C:
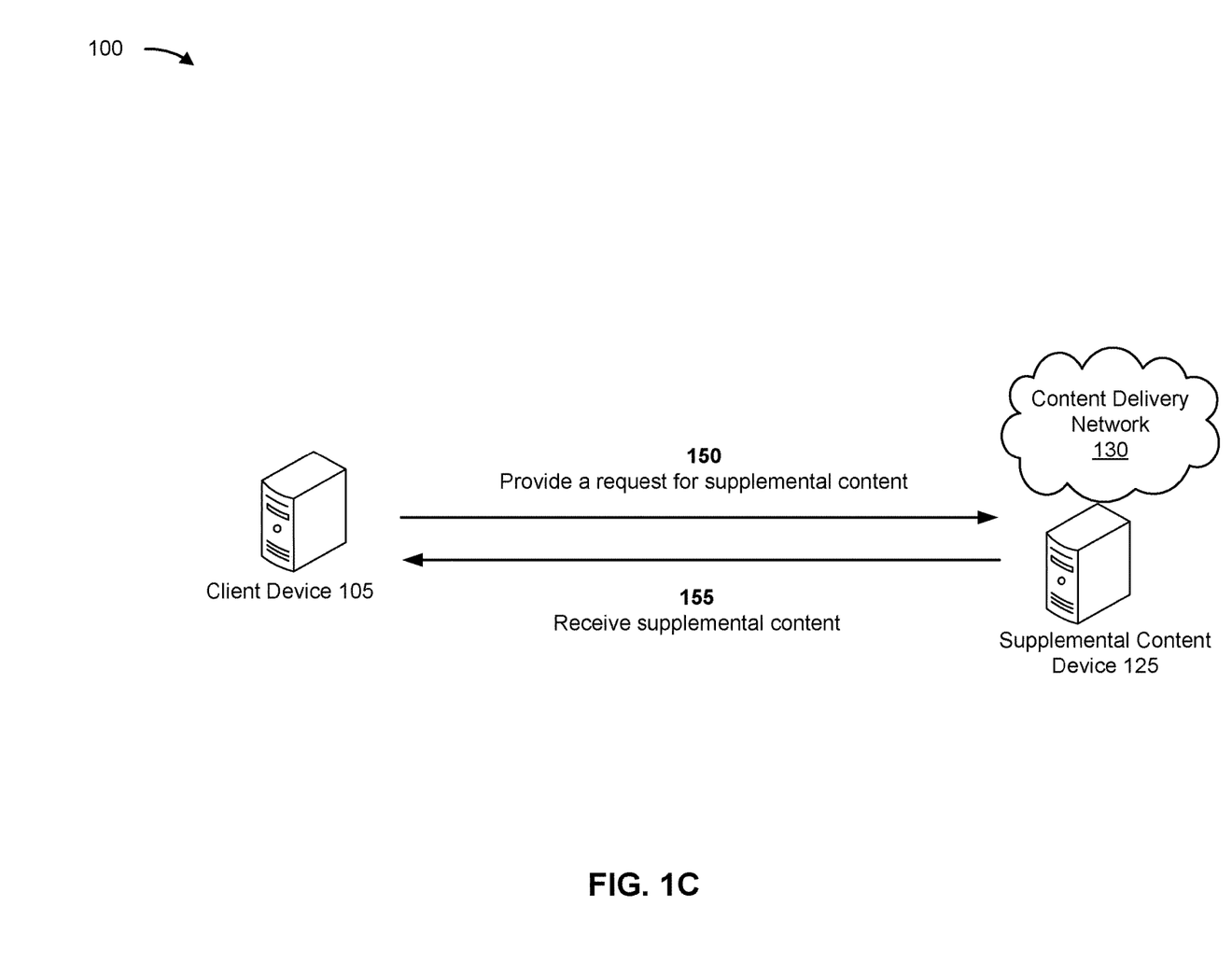

As shown in FIG. 1C, and by reference number 150, client device 105 may provide a request for the supplemental content. In some implementations, based on receiving the supplemental content information, client device 105 may use the supplemental content information to obtain the supplemental content.

For instance, client device 105 may use the location information of the first supplemental content information (e.g., the URL) to provide the request for the first supplemental content. Client device 105 may provide the request for the first supplemental content to a device associated with the URL. As an example, client device 105 may provide the request to a device included in content delivery network 130, such as supplemental content device 125.

In some implementations, client device 105 may determine whether the first supplemental content is stored in a memory of client device 105 prior to providing the request for the first supplemental content. For example, client device 105 may perform a search of the memory using the information identifying the first supplemental content and/or the location information. If client device 105 determines that the first supplemental content is not stored in the memory, client device 105 may provide the request for the first supplemental content. Alternatively, if client device 105 determines that the first supplemental content is stored in the memory, client device 105 may take no action with respect to obtaining the first supplemental content using the location information. Client device 105 may perform similar actions for the second supplemental content and other supplemental content.

As shown in FIG. 1C, and by reference number 155, client device 105 may receive the supplemental content. For example, based on providing the request for the supplemental content, client device 105 may receive the supplemental content from supplemental content device 125. For instance, client device 105 may receive, from supplemental content device 125, the first supplemental content, the second supplemental content, and so on. The supplemental content may be provided in a Moving Picture Experts Group-4 (MPEG-4) Part 14 (MP4) format, in a Moving Picture Experts Group Audio Layer 3 Uniform Resource Locator (MU3) using Unicode Transformation Format-8 (UTF-8) encoded characters (M3U8) format, among other examples.

Client device 105 may store, in the memory of client device 105, the supplemental content in association with the supplemental content information. For example, client device 105 may store the first supplemental content in association with the first supplemental content information, store the second supplemental content in association with the second supplemental content information, and so on.

Figure 1D:
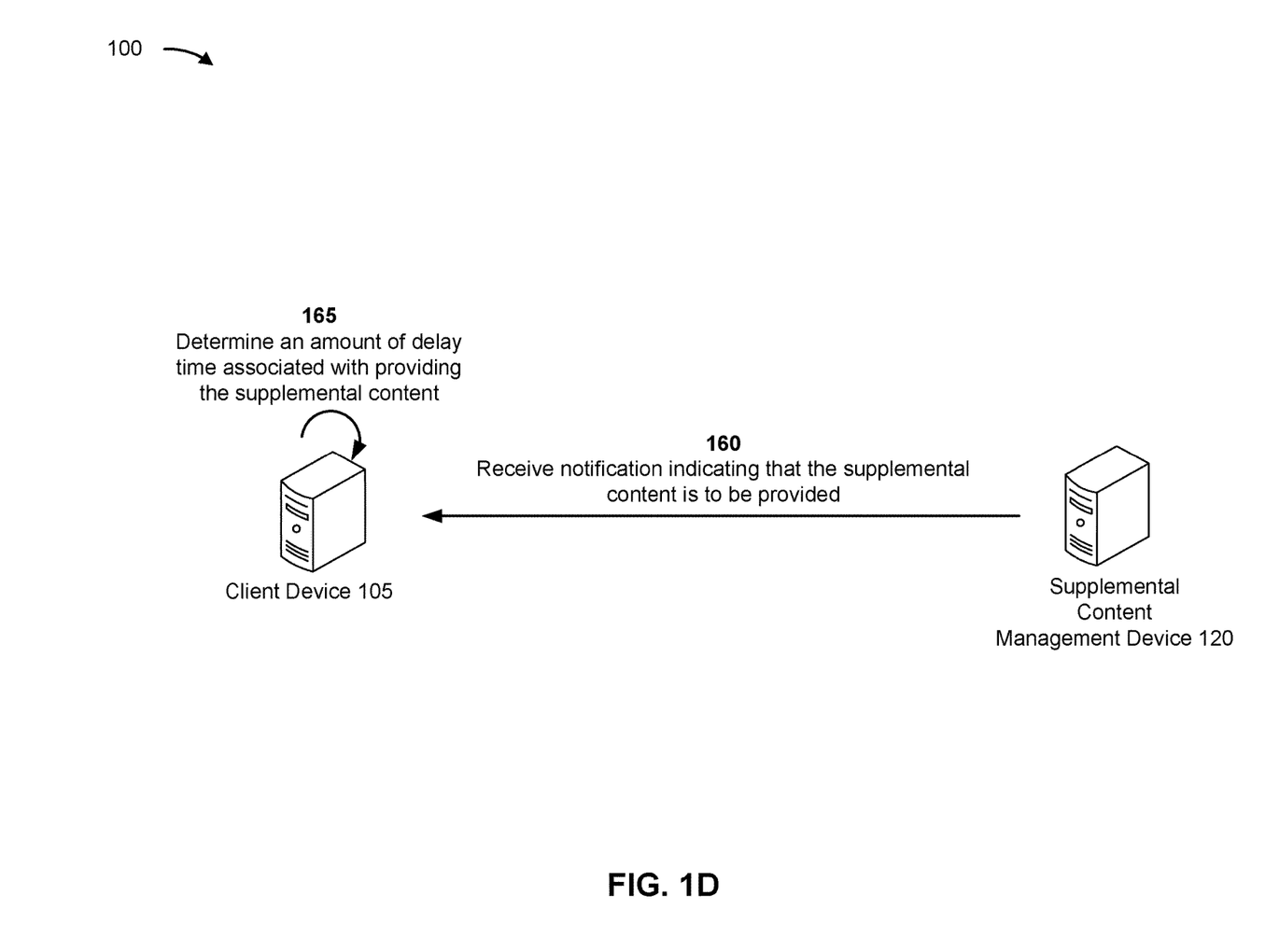

As shown in FIG. 1D, and by reference number 160, client device 105 may receive notification indicating that the supplemental content is to be provided. For example, client device 105 may receive, from supplemental content management device 120, the notification indicating that the supplemental content is to be provided. The notification may be received prior to the time identified by the start time information included in the supplemental content information.

For example, with respect to the first supplemental content, supplemental content management device 120 may provide the notification within a range of time prior to the time identified by the start time information (included in the first supplemental content information). The range of time may be configured by the content provider. In some implementations, supplemental content management device 120 may monitor a current date and a time with respect to the time identified by the start time information. When supplemental content management device 120 determines that the current date and the time is within the range of time of the time identified by the start time information, supplemental content management device 120 may provide the notification.

In some implementations, the notification may include all or a portion of the first supplemental content information. For example, the notification may include the information identifying the QAM channel, the information identifying the first supplemental content, the start time information of the first supplemental content, the duration information of the first supplemental content, among other examples. Supplemental content management device 120 may perform similar actions with respect to the second supplemental content and other supplemental content.

As shown in FIG. 1D, and by reference number 165, client device 105 may determine an amount of delay time associated with providing the supplemental content. In some implementations, the content provided by client device 105 (e.g., using video player 115) may be delayed with respect to the content broadcast by the content provider. Client device 105 may take into account the delay between the content provided by client device 105 and the content broadcast by the content provider when client device 105 determines when to provide the supplemental content.

Client device 105 may determine the amount of delay time as an amount of time corresponding to the delay. In this regard, when determining the amount of delay time, client device 105 may determine a current position (e.g., a current playback position) of the content broadcast by the content provider. For example, client device 105 may receive, from the content device of the content provider, a timestamp indicating the current position. Client device 105 may determine a playback position (e.g., a current playback position) of the content provided by client device 105. Client device 105 may determine the amount of delay time based on a difference between the current position and the playback position.

In some situations, the amount of delay time may be zero if the user is viewing the content as the content is being broadcast by the content provider (e.g., viewing the content live). Alternatively, the amount of delay time may be greater than zero if the user is viewing with some delay with respect to the content that is being broadcast by the content provider (for example, by the user requesting a pause action or rewind action when viewing the content).

In some situations, after determining the amount of delay time, client device 105 may detect a request to rewind content and/or a request to fast forward content. If client device 105 detects the request to rewind content, client device 105 may recalculate the amount of delay time in a manner similar to the manner described. In this regard, the playback position may be a new playback position as a result of the request to rewind content. If client device 105 detects the request to fast forward content and determines that the request is fast forwarded to a new playback position that is beyond the duration of the first supplemental content, client device 105 may prevent the first supplemental content from being provided.

Figure 1E:
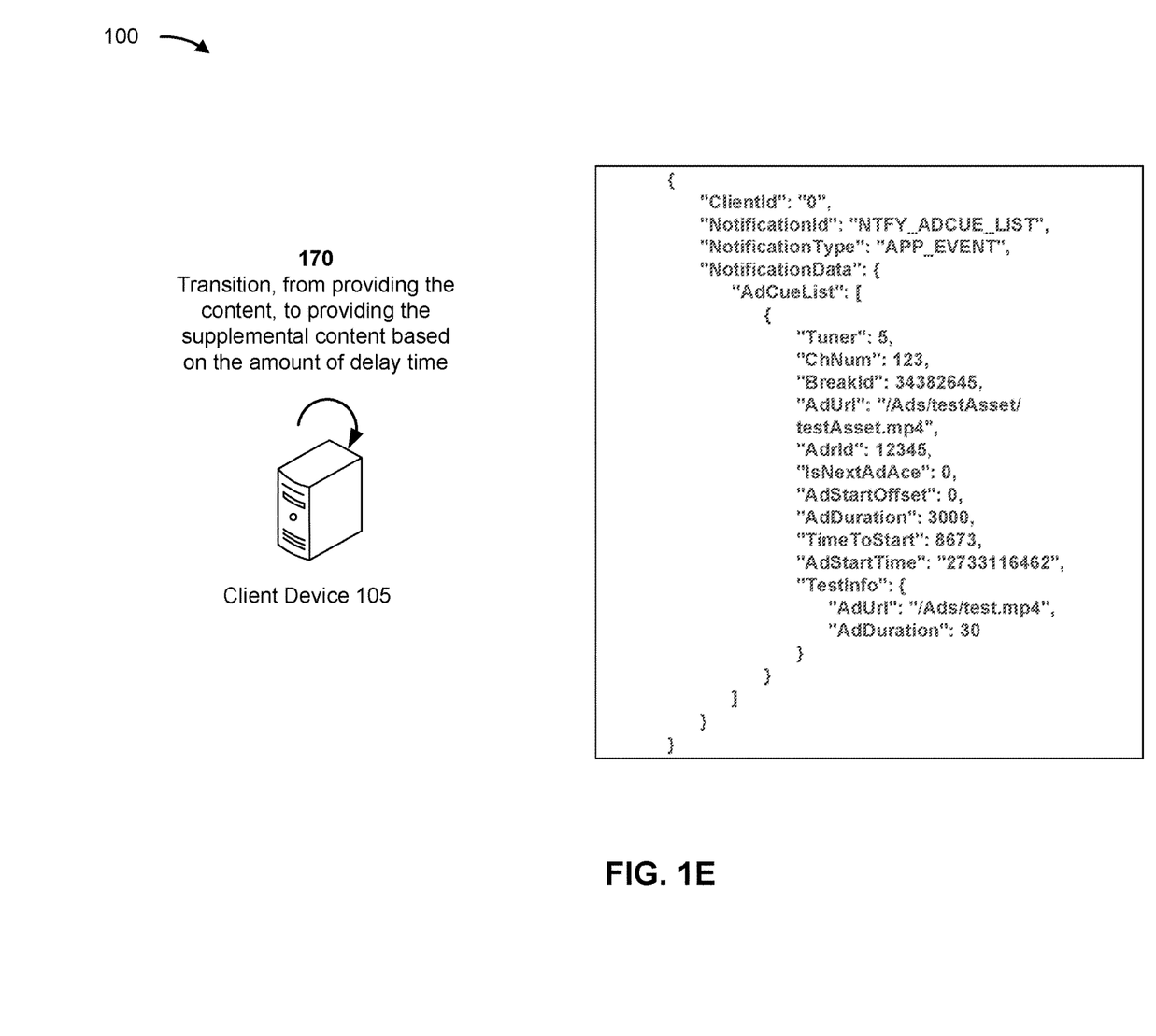

As shown in FIG. 1E, and by reference number 170, client device 105 may transition, from providing the content, to providing the supplemental content. In some implementations, supplemental content client 110 may generate a message and provide the message to video player 115 to cause video player 115 to provide the supplemental content. For example, with respect to the first supplemental content, the message may include the information identifying the first supplemental content, the location information of the first supplemental content, the start time information of the first supplemental content, the duration information of the first supplemental content, among other examples. The message may include similar information for the second supplemental content. The message may be provided over the API that connects the supplemental content client 110 to the video player 115.

In some implementations, the message may be provided in a JavaScript Object Notation (JSON) format, among other examples of formats that may be used to provide information regarding the supplemental content. FIG. 1E shows an example message in JSON format that includes a plurality of key-value pairs. For example, among the plurality of key-value pairs, the message may include a first key (e.g., "ClientId") for identifying client device 105, a second key (e.g., "NotificationId") for identifying the message, a third key (e.g., "NotificationType") for identifying a type of the message, a fourth key (e.g., "Tuner") for identifying the QAM channel, a fifth key (e.g., "AdUrl") for identifying a location of the first supplemental content in the memory of client device 105, a sixth key (e.g., "AdrId") for identifying the first supplemental content (e.g., when providing notifications to supplemental content management device 120), a seventh key (e.g., "AdStartOffset") for identifying an offset with respect to a time when other prior supplemental content is to be provided, an eighth key (e.g., "AdDuration") for identifying the duration information of the first supplemental content, a ninth key (e.g., "AdStartTime") for identifying the start time information of the first supplemental content, a tenth key (e.g., "TimeToStart") for identifying the PTS associated with the first supplemental content, among other examples of key value pairs.

The key value pairs illustrated in FIG. 1E are provided as examples. In practice, there may be additional key-value pairs, fewer key-value pairs, different key-value pairs, and so forth.

Video player 115 may use the start time information to determine when to provide the first supplemental information. For example, when video player 115 detects that a current time is the time identified by the start time information, video player 115 may transition from providing the content to providing the first supplemental content. For example, client device 105 may switch from a QAM channel stream to playback for the first supplemental content from the memory of client device 105. In some implementations, client device 105 may use the information identifying the first supplemental content and/or the location information to identify the first supplemental content stored in the memory of client device 105.

In some situations, when transitioning to providing the supplemental content, client device 105 may transition to providing the supplemental content based on the start time information and the amount of delay time. For example, client device 105 may transition to provide the supplemental content after expiration of the amount of delay time following the time when the first supplemental content is to be provided.

Video player 115 may perform similar actions with respect to the second supplemental content. In some examples, video player 115 may transition, from providing the first supplemental content, to providing the second supplemental content based on start time information of the second supplemental content information and/or offset information of the second supplemental content information.

Figure 1F:
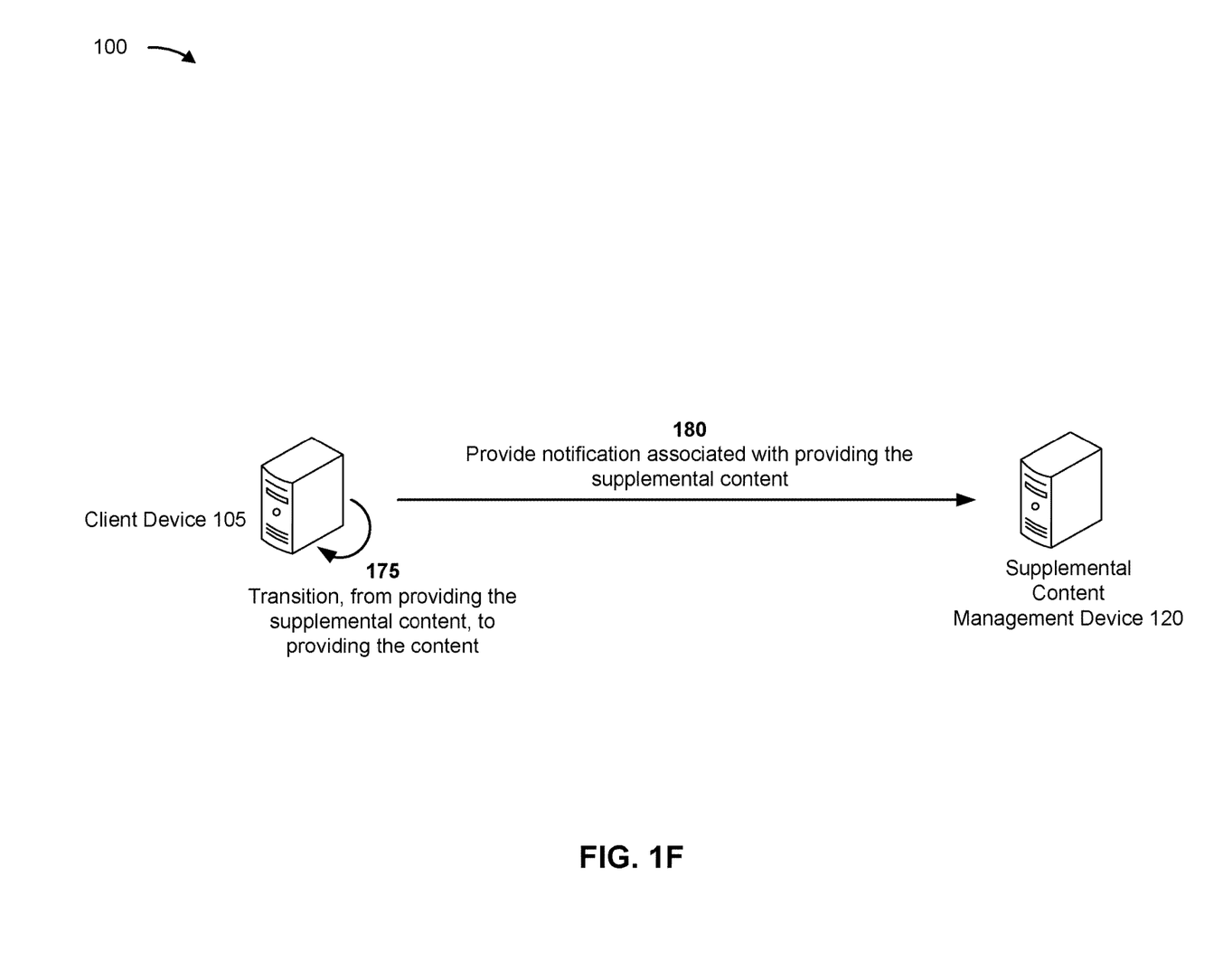

As shown in FIG. 1F, and by reference number 175, client device 105 may transition, from providing the supplemental content, to providing the content. In some implementations, after providing the first supplemental content during the duration identified by the duration information, client device 105 may transition, from providing the first supplemental content, to providing the content. For example, client device 105 may switch from playback from the memory of client device 105 to providing the content via the QAM channel.

In some implementations, video player 115 may determine an updated playback position of the content based on an actual duration of providing the first supplemental content. The actual duration may be an entirety of, or a portion of, the duration identified by the duration information based on requests from the user during the first supplemental content, as described below. When transitioning to providing the supplemental content, video player 115 may determine the playback position of the content based on the current position of the content (previously determined) and the actual duration of providing the first supplemental content. For example, video player 115 may add the actual duration to the current position of the content to determine the updated playback position. Video player 115 may provide the content from the updated playback position.

In some situations, client device 105 may detect a rewind request to rewind content after a portion of the supplemental content has been provided. Based on detecting the rewind request, video player 115 may terminate the first supplemental content. In some situations, if the second supplemental content is to be provided after the first supplemental content, client device 105 may provide the second supplemental content. Alternatively, if no additional supplemental content is to be provided after the first supplemental content, client device 105 may transition to provide the content.

In some examples, client device 105 may detect a pause request to pause content after a portion of the first supplemental content has been provided. Client device 105 may pause providing the first supplemental content based on detecting the pause request. After pausing the first supplemental content, client device 105 may determine whether a resume request to resume providing the first supplemental content is detected prior to an expiration of the duration associated with providing the first supplemental content. If client device 105 detects the resume request prior to the expiration of the duration, video player 115 may resume providing the first supplemental content for a remainder of the duration. Alternatively, if client device 105 does not detect the resume request prior to the expiration of the duration, video player 115 may transition to providing content other than the first supplemental content, such as the second supplemental content or the content.

As shown in FIG. 1F, and by reference number 180, client device 105 may provide notification associated with providing the supplemental content. For example, client device 105 (e.g., using video player 115) may provide the notification to supplemental content management device 120. The notification may include information indicating whether the supplemental content has been provided, information identifying a portion of the supplemental content that was provided, the information identifying the QAM channel, among other examples.

With respect to recorded content received from the QAM channel and stored on the memory of client device 105, client device 105 may perform actions similar to actions described above. In some implementations, the recorded content may be associated with information such as the information identifying the QAM channel, information identifying a date and/or a time when the content was first broadcast, information identifying one or more portions (of a duration of the recorded content) during which supplemental content may be provided, among other examples.

When client device 105 initiates a playback of the recorded content, video player 115 may provide the information associated with the recorded content to supplemental content management device 120. Based on the information associated with the recorded content, supplemental content management device 120 may identify supplemental content and supplemental content information regarding the supplemental content in a manner similar to the manner described above. Supplemental content management device 120 may provide the supplemental content information to client device 105 and client device 105 may obtain the supplemental content and provide the supplemental content in a manner similar to the manner described above.

By providing IP-based supplemental content in this manner, the client device may preserve computing resources, network resources, and other resources that would have otherwise been used by relying on QAM bandwidth for providing supplemental content.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
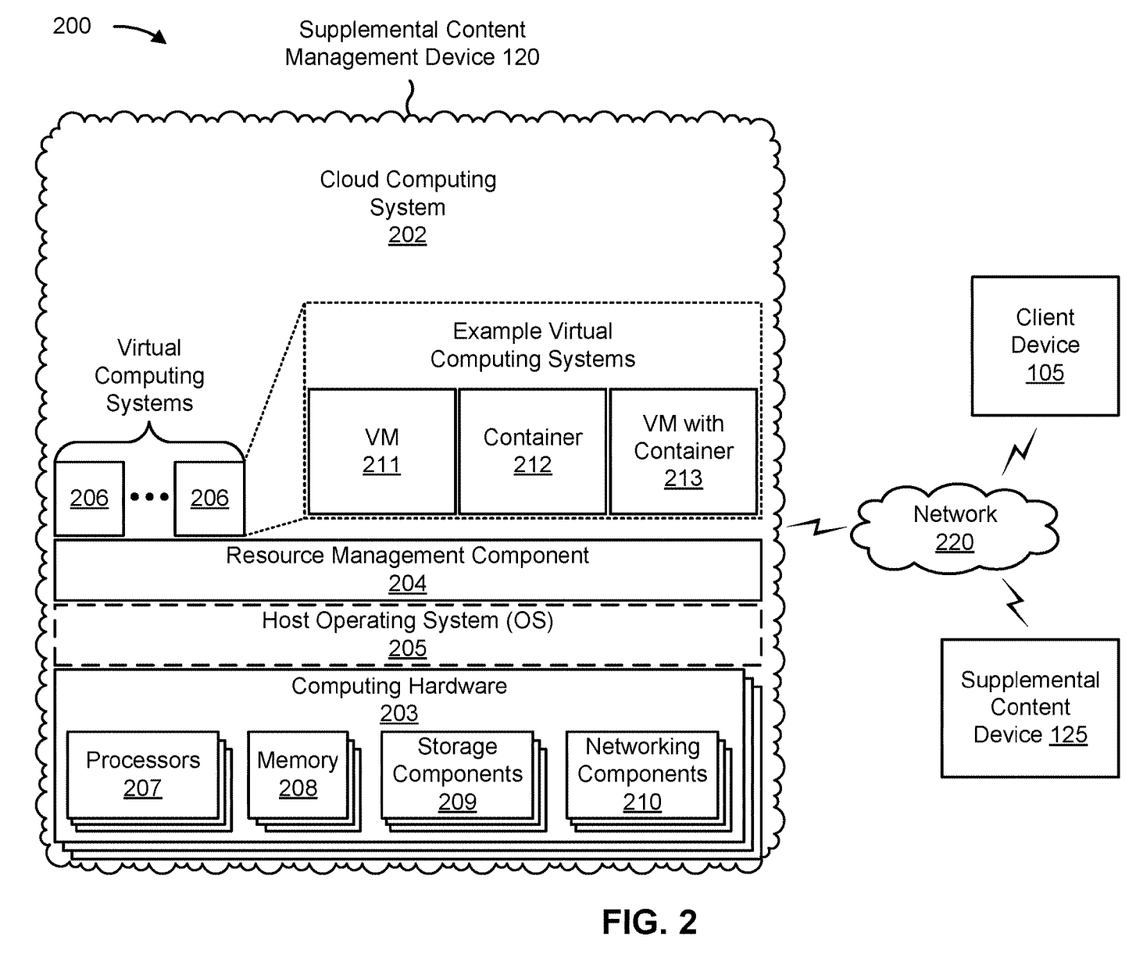
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a supplemental content management device 120, which may include one or more elements of and/or may execute within a cloud computing system 202. The cloud computing system 202 may include one or more elements 203-213, as described in more detail below. As further shown in FIG. 2, environment 200 may include client device 105, supplemental content device 125, and/or a network 220. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a private data center platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the supplemental content management device 120 may include one or more elements 203-213 of the cloud computing system 202, may execute within the cloud computing system 202, and/or may be hosted within the cloud computing system 202, in some implementations, the supplemental content management device 120 may not be cloud-based (e.g., may be implemented outside of a cloud computing system) or may be partially cloud-based. For example, the supplemental content management device 120 may include one or more devices that are not part of the cloud computing system 202, such as device 300 of FIG. 3, which may include a standalone server or another type of computing device. The supplemental content management device 120 may perform one or more operations and/or processes described in more detail elsewhere herein.

Client device 105 may include a set-top box, a television, a mobile phone (e.g., a smart phone, a radiotelephone, and/or the like), a laptop computer, a tablet computer, a desktop computer, a handheld computer, a gaming device, among other examples. Supplemental content device 125 may include a laptop computer, a desktop computer, a group of server devices, among other examples.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
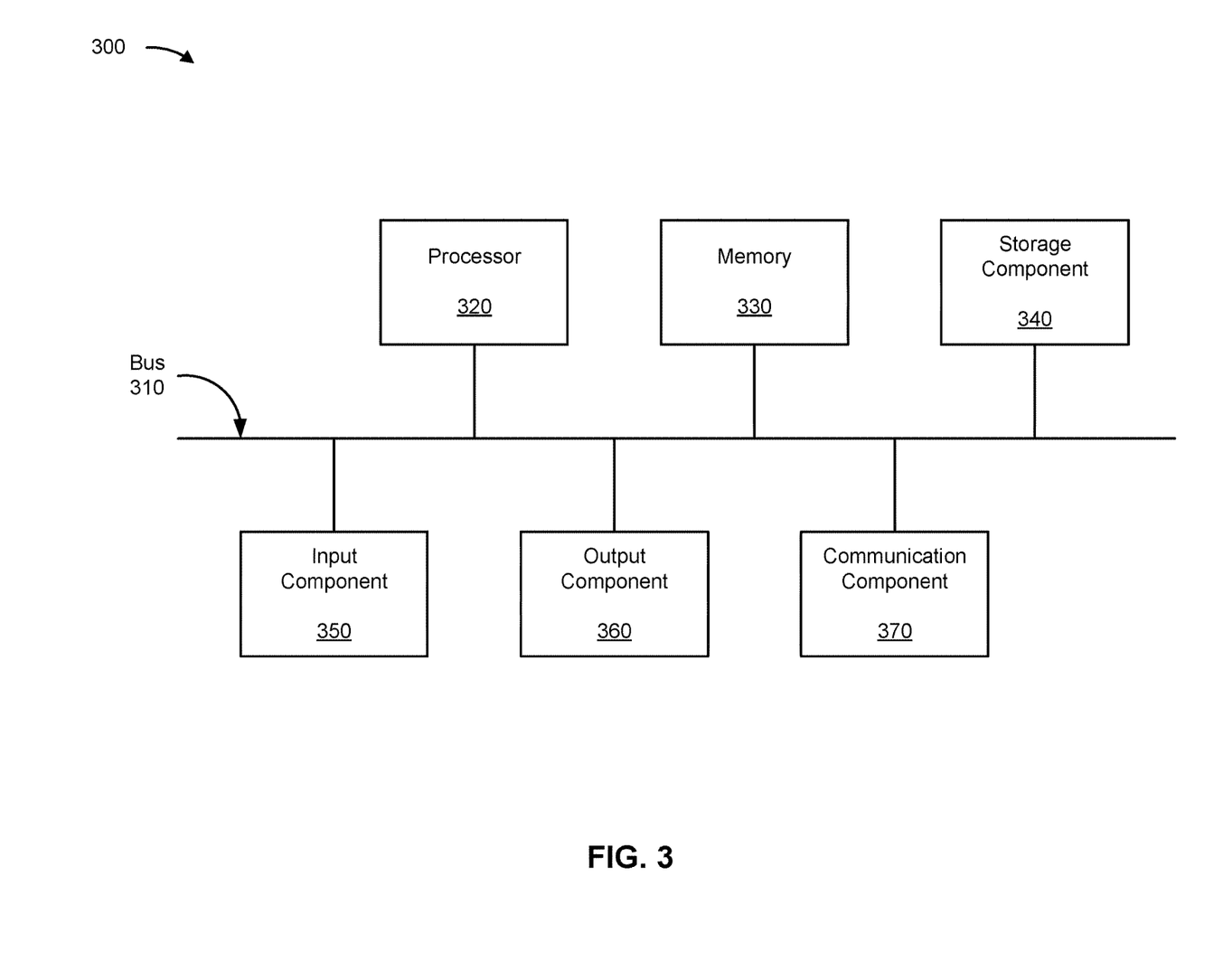
FIG. 3 is a diagram of example components of one or more devices of FIG. 2.

FIG. 3 is a diagram of example components of a device 300, which may correspond to client device 105, supplemental content management device 120, and/or supplemental content device 125. In some implementations, client device 105, supplemental content management device 120, and/or supplemental content device 125 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
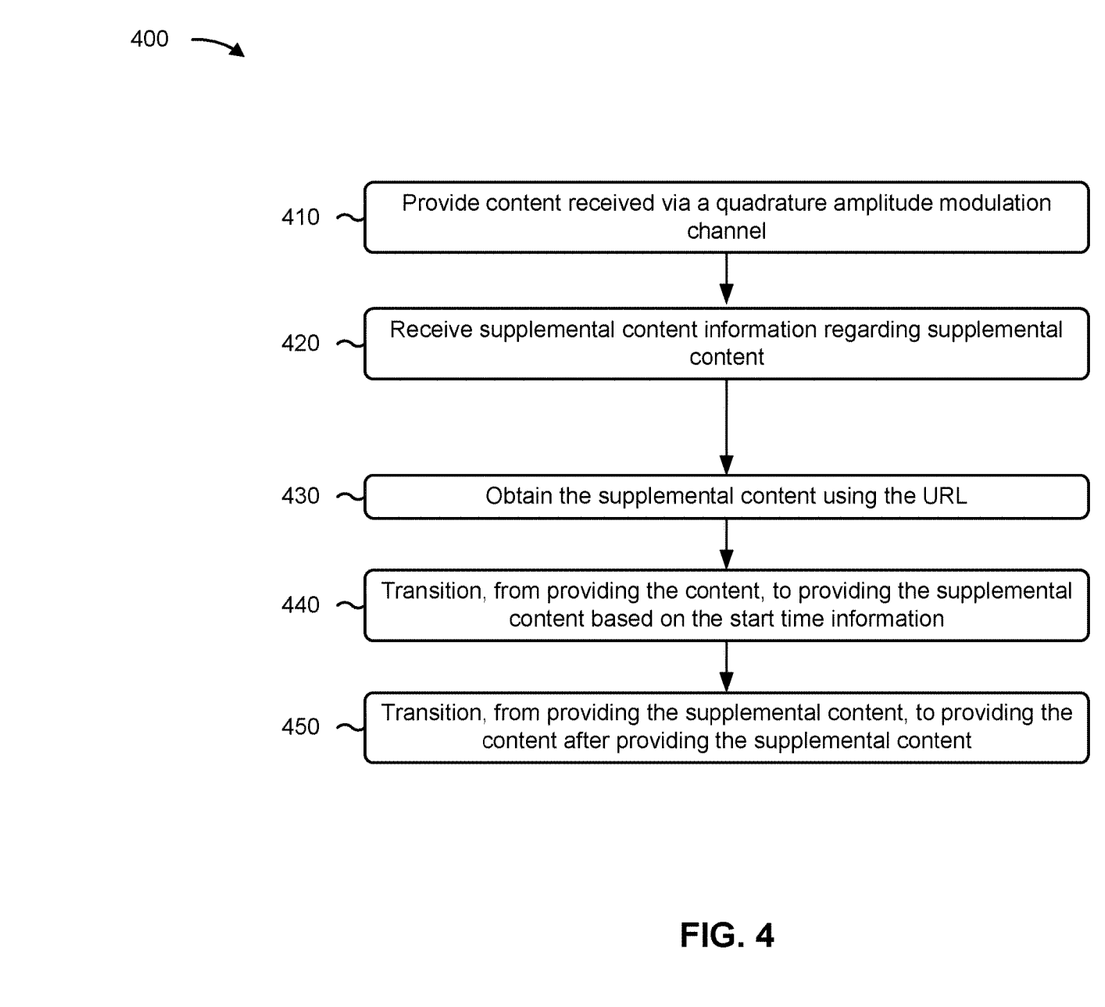
FIG. 4 is a flowchart of an example process associated with transitioning between different content.

FIG. 4 is a flowchart of an example process 400 associated with transitioning between different content. In some implementations, one or more process blocks of FIG. 4 may be performed by a device (e.g., client device 105). In some implementations, one or more process blocks of FIG. 4 may be performed by another device or a group of devices separate from or including the device, such as a supplemental content management device (e.g., supplemental content management device 120) and/or a supplemental content device (e.g., supplemental content device 125). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include providing content received via a quadrature amplitude modulation channel (block 410). For example, the device may provide content received via a quadrature amplitude modulation channel, as described above.

As further shown in FIG. 4, process 400 may include receiving supplemental content information regarding supplemental content to be provided during a period of time associated with providing the content (block 420). For example, the device may receive supplemental content information regarding supplemental content to be provided during a period of time associated with providing the content, wherein the supplemental content information includes a URL identifying a location of the supplemental content and start time information identifying a time when the supplemental content is to be provided, as described above. In some implementations, the supplemental content information includes a URL identifying a location of the supplemental content and start time information identifying a time when the supplemental content is to be provided.

In some implementations, the supplemental content information further includes duration information identifying a duration associated with providing the supplemental content.

As further shown in FIG. 4, process 400 may include obtaining the supplemental content using the URL (block 430). For example, the device may obtain the supplemental content using the URL, as described above.

In some implementations, obtaining the supplemental content using the URL comprises determining whether the supplemental content is stored in a memory of the device, and obtaining the supplemental content using the URL based on determining that the supplemental content is not stored in the memory of the device.

As further shown in FIG. 4, process 400 may include transitioning, from providing the content, to providing the supplemental content based on the start time information (block 440). For example, the device may transition, from providing the content, to providing the supplemental content based on the start time information, as described above. In some implementations, transitioning to providing the supplemental content includes providing the supplemental content during the duration identified by the duration information.

As further shown in FIG. 4, process 400 may include transitioning, from providing the supplemental content, to providing the content after providing the supplemental content (block 450). For example, the device may transition, from providing the supplemental content, to providing the content after providing the supplemental content, as described above.

In some implementations, the supplemental content is a first supplemental content, and wherein the method further comprises detecting a rewind request to rewind content after a portion of the supplemental content has been provided, terminating the supplemental content based on detecting the rewind request, and providing second supplemental content after terminating the supplemental content.

In some implementations, the device is a first device, wherein receiving the supplemental content information includes receiving the supplemental content information from a second device, and wherein the method further comprises providing, to the second device, a notification indicating that the supplemental content has been provided after transitioning to providing the content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a device, the method comprising:
providing content received via a quadrature amplitude modulation (QAM) channel;
receiving supplemental content information regarding supplemental content to be provided during a period of time associated with providing the content,
wherein the supplemental content information includes information identifying the QAM channel, a uniform resource locator (URL) identifying a location of the supplemental content, and start time information identifying a time when the supplemental content is to be provided;
obtaining the supplemental content using the URL, wherein the supplemental content is stored in a memory of the device;
transitioning, from providing the content via the QAM channel, to providing the supplemental content from the memory based on the start time information,
wherein the supplemental content is provided from the memory based on unavailability of QAM bandwidth to provide the supplemental content; and
transitioning, from providing the supplemental content, to providing the content after providing the supplemental content.

2. The method of claim 1, further comprising:
determining a current position of the content broadcast by a content provider;
determining a playback position of the content provided by the device; and
determining an amount of delay time based on a difference between the current position and the playback position,
wherein transitioning to providing the supplemental content includes:
transitioning to providing the supplemental content based on the start time information and the amount of delay time.

3. The method of claim 2, wherein transitioning to providing the supplemental content includes:
transitioning to providing the supplemental content after expiration of the amount of delay time following the time when the supplemental content is to be provided.

4. The method of claim 1, wherein the supplemental content information further includes duration information identifying a duration associated with providing the supplemental content, and
wherein transitioning to providing the supplemental content includes:
providing the supplemental content during the duration identified by the duration information.

5. The method of claim 1, wherein obtaining the supplemental content using the URL comprises:
determining whether the supplemental content is stored in the memory of the device; and
obtaining the supplemental content using the URL based on determining that the supplemental content is not stored in the memory of the device.

6. The method of claim 1, wherein the supplemental content is a first supplemental content, and
wherein the method further comprises:
detecting a rewind request to rewind content after a portion of the supplemental content has been provided;
terminating the supplemental content based on detecting the rewind request; and
providing second supplemental content after terminating the supplemental content.

7. The method of claim 1, wherein the device is a first device,
wherein receiving the supplemental content information includes receiving the supplemental content information from a second device, and
wherein the method further comprises:
providing, to the second device, a notification indicating that the supplemental content has been provided after transitioning to providing the content.

8. A device, comprising:
one or more processors configured to:
provide content received via a quadrature amplitude modulation (QAM) channel;
receive supplemental content information regarding supplemental content associated with the content,
wherein the supplemental content information includes location information identifying a location of the supplemental content and start time information identifying a time when the supplemental content is to be provided;
obtain the supplemental content using the location information,
wherein the supplemental content is obtained using the location information to prevent a request for QAM bandwidth to provide the supplemental content; and
transition, from providing the content, to providing the supplemental content based on the start time information.

9. The device of claim 8, wherein the device is a first device, and
wherein the one or more processors, to transition to providing the supplemental content information, are configured to:
receive, from a second device and prior to the time identified by the start time information, a notification indicating that the supplemental content is to be provided, and
transition, from providing the content, to providing the supplemental content based on the notification.

10. The device of claim 8, wherein the device is a first device, and
wherein the one or more processors, to receive the supplemental content information, are configured to:
provide, to a second device, a notification that the first device has tuned to the QAM channel, and
receive, from the second device, the supplemental content information based on providing the notification,
wherein the supplemental content is content that is based on a geographical location of the first device.

11. The device of claim 8, wherein the supplemental content information further includes duration information identifying a duration associated with providing the supplemental content, and
wherein the one or more processors are further configured to:
transition, from providing the supplemental content, to providing the content after providing the supplemental content during the duration identified by the duration information.

12. The device of claim 8, wherein the supplemental content is first supplemental content,
   wherein the supplemental content information further includes location information identifying a location of second supplemental content associated with the content and offset information identifying an offset with respect to the time when the supplemental content is to be provided, and
   wherein the one or more processors are further configured to:
      obtain the second supplemental content using the location information of the second supplemental content, and
      transition, from providing the first supplemental content, to providing the second supplemental content based on the offset information.

13. The device of claim 8, wherein the supplemental content information further includes duration information identifying a duration associated with providing the supplemental content, and
   wherein the one or more processors are further configured to:
      detect a pause request to pause content after a portion of the supplemental content has been provided;
      pause providing the supplemental content based on detecting the pause request;
      determine whether a resume request to resume providing the supplemental content is detected prior to an expiration of the duration; and
      selectively resume providing the supplemental content or transition to providing other content,
         wherein the supplemental content is provided for a remainder of the duration when the resume request is detected prior to the expiration of the duration, and
         wherein the other content is provided when the resume request is not detected prior to the expiration of the duration.

14. The device of claim 8, wherein the one or more processors are further configured to:
   determine a current position of the content broadcast by a content provider;
   determine a playback position of the content provided by the device;
   determine an amount of delay time based on a difference between the current position and the playback position; and
   transition, from providing the content, to providing the supplemental content based on the start time information and the amount of delay time.

15. A non-transitory computer-readable medium storing a set of instructions, the set of instructions comprising:
   one or more instructions that, when executed by one or more processors of a device, cause the device to:
      provide a notification that the device has tuned to a quadrature amplitude modulation (QAM) channel;
      receive, based on providing the notification, supplemental content information regarding supplemental content associated with content provided via the QAM channel,
         wherein the supplemental content information includes location information identifying a location of the supplemental content and start time information identifying a time when the supplemental content is to be provided;
      obtain the supplemental content using the location information of the supplemental content; and
      transition, from providing the content, to providing the supplemental content based on the start time information,
         wherein the supplemental content is provided from a memory associated with the device based on unavailability of QAM bandwidth to provide the supplemental content.

16. The non-transitory computer-readable medium of claim 15, wherein the supplemental content information further includes duration information identifying a duration associated with providing the supplemental content, and
   wherein the one or more instructions, when executed by the one or more processors, further cause the device to:
      transition, from providing the supplemental content, to providing the content after providing the supplemental content during the duration identified by the duration information.

17. The non-transitory computer-readable medium of claim 15, wherein the one or more instructions, that cause the device to obtain the supplemental content, cause the device to:
   determine whether the supplemental content is stored in the memory associated with the device; and
   obtain the supplemental content using the location information when the supplemental content is not stored in the memory of the device.

18. The non-transitory computer-readable medium of claim 15, wherein the device is a first device, and
   wherein the one or more instructions, that cause the device to transition to providing the supplemental content information, cause the device to:
      receive, from a second device and prior to the time identified by the start time information, a notification indicating that the supplemental content is to be provided; and
      transition, from providing the content, to providing the supplemental content based on the notification indicating that the supplemental content is to be provided.

19. The non-transitory computer-readable medium of claim 18, wherein the one or more instructions, when executed by the one or more processors, further cause the device to:
   provide, to the second device, a notification indicating that the supplemental content has been provided after providing the supplemental content.

20. The non-transitory computer-readable medium of claim 15, wherein the one or more instructions further cause the device to:
   determine a current position of the content broadcast by a content provider;
   determine a playback position of the content provided by the device;
   determine an amount of delay time based on a difference between the current position and the playback position;
   detect a request to fast forward the supplemental content after determining the amount of delay time;
   determine whether a new payback position is beyond a duration of the supplemental content; and
   prevent the supplemental content from being provided when the new playback position is beyond the duration of the supplemental content.

* * * * *